United States Patent [19]

Leinweber

[11] Patent Number: 5,085,570
[45] Date of Patent: Feb. 4, 1992

[54] PRESS FOR FORMING BODIES

[75] Inventor: Johann Leinweber, Wr. Neustadt, Australia

[73] Assignee: Leinweber Maschinen Gesellschaft M.B.H. & Co. KG, Wr. Neustadt, Australia

[21] Appl. No.: 664,062

[22] Filed: Mar. 4, 1991

[51] Int. Cl.$^5$ .................................................. B29C 43/00
[52] U.S. Cl. ..................................... 425/195; 425/253; 425/346; 425/398; 425/412
[58] Field of Search ............... 425/193, 195, 253, 340, 425/344, 346, 351, 358, 398, 392, 412, 413, 416, 452; 100/93 PB

[56] References Cited

U.S. PATENT DOCUMENTS

| | | | |
|---|---|---|---|
| 3,545,045 | 12/1970 | Vinson | 425/193 |
| 4,050,865 | 9/1977 | Drostholm et al. | 425/195 |
| 4,139,593 | 3/1979 | Holz et al. | 425/346 |
| 4,490,103 | 12/1984 | Vogt | 425/344 |
| 4,968,468 | 11/1990 | Leinweber | 425/416 |

Primary Examiner—Jay H. Woo
Assistant Examiner—C. Scott Bushey
Attorney, Agent, or Firm—Herbert Dubno; Andrew Wilford

[57] ABSTRACT

A press for making rigid bodies out of fluent particles has, a cylinder block formed with a plurality of parallel cylinder bores opening into the chamber, respective pistons axially displaceable in the bores of the block, and respective little piston plungers fixed releasably to and projecting outward from the pistons. Respective little dies form little cavities in which the plungers are complementarily engageable. A holder positions workpieces of the particles in partially compacted condition in line with the cavities of the little dies so that respective little pushout plungers can push the workpieces out of the holders into the respective dies. A counter piston is displaceable hydraulically against the cavities after the workpieces have been pushed thereinto. The cylinders of the block are then pressurized to push the little piston plungers into the cavities and compress the workpieces therein. Instead of the little piston plungers and dies it is possible to mount a bridge element on two of the pistons instead of two of the little pistons and a big piston plunger on the bridge element. In this case a big die is mounted instead of at least some of the little dies and forms a cavity in which the big piston plunger is complementarily engageable. Here also a big pushout plunger instead of at least some of the little pushout plungers is operable like the little pushout plungers to push a workpiece out of the holder into the big die.

5 Claims, 2 Drawing Sheets

PRESS FOR FORMING BODIES

FIELD OF THE INVENTION

The present invention relates to a press. More particularly this invention concerns a press used to compact a mass of particles into a rigid body.

BACKGROUND OF THE INVENTION

In the manufacture of a rigid body, for instance a brake pad for a brake shoe, from a mass of loose and fluent particles, it is typically necessary to preform the mass into a vaguely coherent workpiece that is held in a throughgoing passage of a holder. A transfer plunger pushes the workpiece out of its passage into a cavity of a die and the holder is moved out of the way and replaced by a counter piston carrying a backing plate. Then a plunger defining the floor of the die cavity is raised under considerable pressure while the mass in the die is heated to form it into a rigid body that adheres to the backing plate. Subsequently the press is opened and the finished brake shoe is taken out and sent on to the next manufacturing stage.

Such a product is typically made in a variety of sizes so that the press must be adapted to different workpieces. The press capacity can vary from 30t to 100t depending on the type of workpiece being made, with even smaller and greater press capacities being possible. When multiple dies are used the loading of the press and its general operation are normally unsatisfactory, involving using the press at much less than its capacity. In addition with such multiple dies if any one die cavity is not filled to the exact same extent as the other die cavities, the whole batch of workpieces is typically spoiled.

OBJECTS OF THE INVENTION

It is therefore an object of the present invention to provide an improved press for forming rigid bodies.

Another object is the provision of such an improved press for forming rigid bodies which overcomes the above-given disadvantages, that is which can readily be set up to make big and/or little such bodies.

SUMMARY OF THE INVENTION

A press for making rigid bodies out of fluent particles according to the invention has a frame, a cylinder block in the frame formed with a plurality of parallel cylinder bores, respective pistons axially displaceable in the bores of the block, and respective little piston plungers fixed releasably to and projecting outward from the pistons. Respective little dies mounted on the frame form little cavities in which the plungers are complementarily engageable. These plungers are displaceable between advanced positions generally filling the respective dies and retracted positions withdrawn inside the respective dies. A holder positions workpieces of the particles in partially compacted condition in line with the cavities of the little dies so that respective little pushout plungers displaceable on the frame can push the workpieces out of the holders into the respective dies. A counter piston is displaceable hydraulically on the frame against the cavities after the workpieces have been pushed thereinto. The cylinders of the block are pressurized to push the little piston plungers into the cavities and compress the workpieces therein. Instead of the little piston plungers and dies according to this invention it is possible to mount a bridge element on two of the pistons instead of two of the little pistons and a big piston plunger on the bridge element. In this case a big die is mounted on the frame instead of at least some of the little dies and forms a cavity in which the big piston plunger is complementarily engageable. Here also a big pushout plunger displaceable on the frame instead of at least some of the little pushout plungers is operable like the little pushout plungers to push a workpiece out of the holder into the big die.

The use of a common cylinder block for multiple pistons makes the press very compact. The relatively closely spaced pistons can work with individual plungers to make individual compacted bodies, or can work together by means of the inventive bridge element to make a number of bodies that is less than the number of pistons. Clearly when the bridge element is used, the compressive force is increased as is necessary for larger bodies. Thus when a short run of a particular size of workpiece needs to be made, it is a relatively simple matter to refit the press with different plungers and dies and do it.

According to a feature of this invention the block is formed with a single pressurizable chamber into which the cylinders all open. This greatly simplifies construction of the inventive press and makes it extremely compact. There can be no variation in pressure between adjacent pistons since all are pressurized from a common chamber in turn pressurized by a common pump.

In accordance with a further feature of the invention the bridge element is a plate covering all the pistons and carrying a single such big piston plunger. It is also possible to use in a system with four such pistons arranged in a square array a bridge extending diagonally of the square array. In this case the big plunger is supported on the bridge centrally of the array.

BRIEF DESCRIPTION OF THE DRAWING

The above and other objects, features, and advantages will become more readily apparent from the following, reference being made to the accompanying drawing in which.

DESCRIPTION

Figure 1:
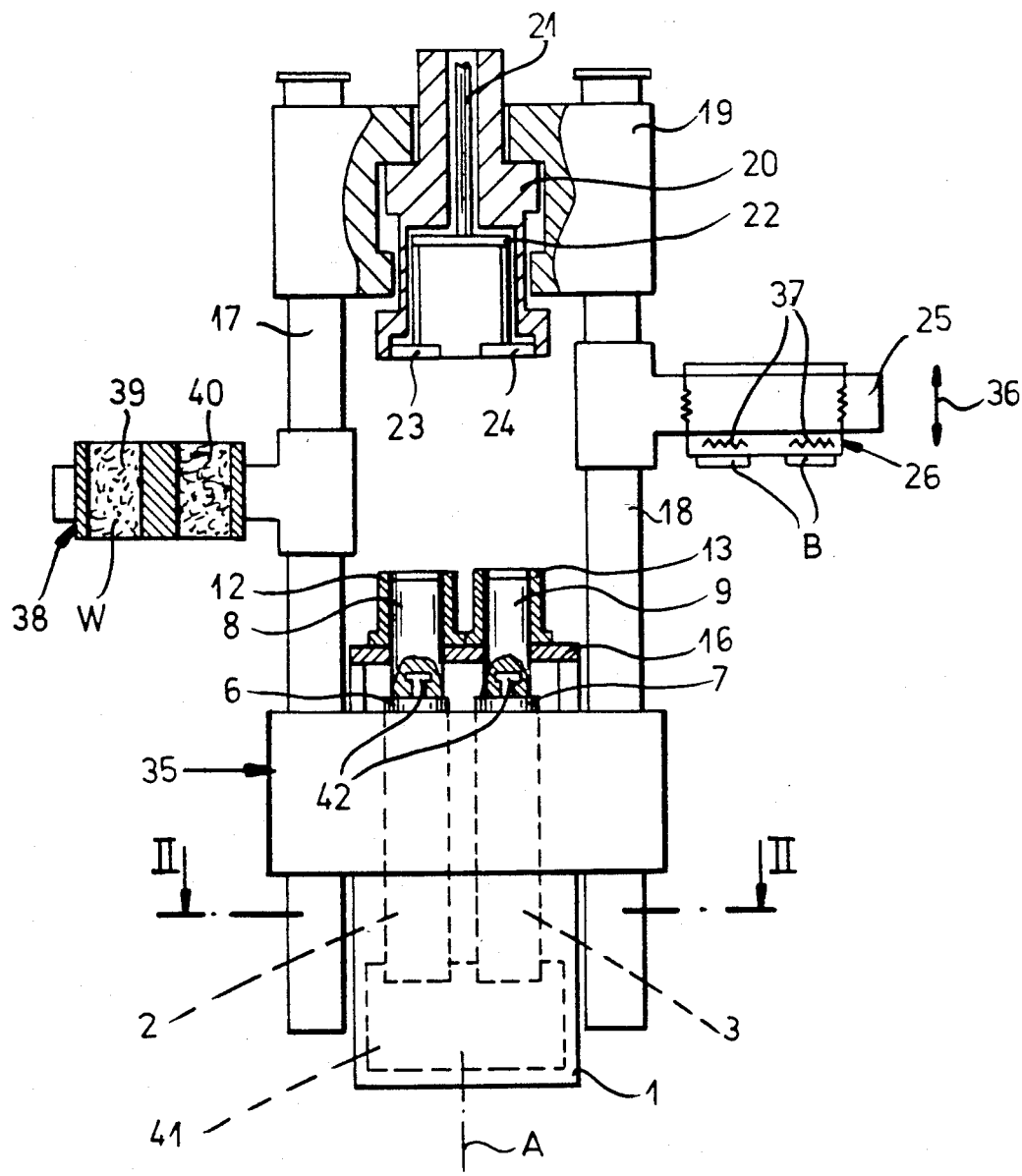
FIG. 1 is a partly diagrammatic side view of the press according to this invention.
Figure 2:
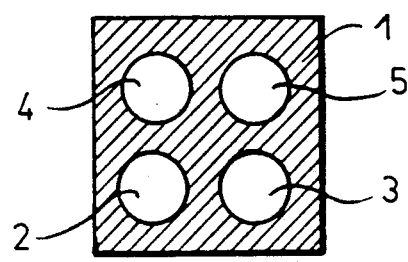
FIG. 2 is a section through the cylinder block taken along line II—II of FIG. 1.
Figure 3:
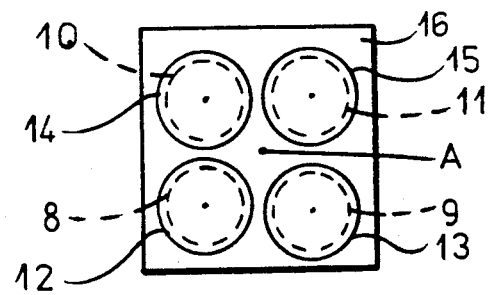
FIG. 3 is a top view of the dies of the system of FIG. 1.
Figure 4:
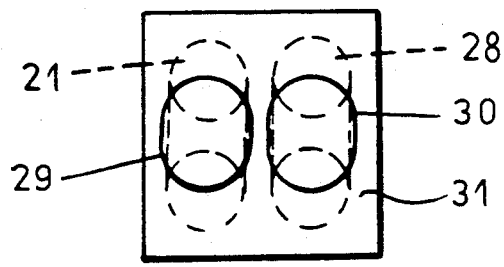
FIGS. 4 and 5 are views like FIG. 3 of variants on the system of this invention.

As seen in FIGS. 1 through 3 a press according to this invention has a cylinder block 1 centered on a vertical axis A and formed centered on this axis A with four radially and axially equispaced cylinders 2, 3, 4, and 5 in which pistons 6 and 7 are axially displaceable and which open into a common chamber 41 that can be pressurized to raise the pistons 6 and 7. These four identical pistons 6, 7 carry four identical die plungers 8, 9, 10, and 11 which are cylindrical and centered on the respective pistons 6 and 7. Releasable T-slot couplings 42 are provided to secure the piston plungers 8 through 11 on the pistons 6 and 7. In turn these plungers 8 through 11 are vertically reciprocal in respective identical heatable die sleeves 12 through 15 which, like the pistons 6 and 7 and the plungers 8-11, are centered on axes parallel to the axis A, radially equispaced therefrom, and angularly equispaced thereabout in a square array. These dies 12, 13, 14, and 15 sit atop a plate 16 fixed on a frame 34 of the apparatus so that they are stationary while of course the respective plungers 8, 9, 10, and 11 are vertically displaceable parallel to the axis A in them. The plungers 8 through 11 have planar upper end surfaces that define the lower surface or floor of die cavities whose vertical sides are defined by the cylindrical inner surfaces of the sleeves 12 through 15.

The frame 35 has uprights 17 and 18 supporting an upper traverse 19 in which a large counter piston 20 centered on the axis A is vertically limitedly reciprocal. This piston 20 accommodates a pusher rod 21 itself having a crosspiece 22 carrying four pushout plungers 23 and 24, one aligned axially with each of the plungers 8 through 11. The lower surfaces of these pushout plungers 23 and 24 are planar and normally are flush with the bottom face of the piston 20.

The one column 18 supports a large plug 26 by means of a pivotal arm 25. This plug 26 is of basically cylindrical shape and has parallel and planar upper and lower surfaces. It and the arm 25 are supported by unillustrated springs for limited vertical movement on the column 18 as illustrated by arrow 36. The plug 26 is provided internally with electromagnets 37 also illustrated diagrammatically so as to be able to cling to ferromagnetic objects, such as backing plates B, on the bottom of the plug 26.

In addition a holder 38 is displaceable from the illustrated position outside the machine to a position with each of four identical cylindrical passages 39 and 40 aligned with the dies 12 through 15, respectively. Each passage 39 and 40 holds a partially consolidated workpiece W that is formed of a mass of particles that are pressed together enough to hold their shape. Each such workpiece W is a cylindrical plinth having an outside diameter roughly equal to the inside diameter of the sleeves 12 through 15 and a vertical height equal roughly to the axial spacing between the upper faces of the plungers 8, 9 in their lowermost positions and the upper edges of the sleeves 12 through 15.

The device described above operates as follows:

To start with everything is in the position of FIG. 1, with the piston 20 raised and its plungers 23 and 24 retracted, and with the pistons 6 and 7 raised so the upper end faces of the plungers 8 through 11 are roughly level with the upper edges of the die sleeves 12 though 15. The plug 26 and arm 25 are swung outside the press.

Then the holder 38 is moved into place to set the workpieces W atop the upper ends of the plungers 8 through 11. The rod 21 is advanced axially downward with the pushout plungers 23 and 24 while synchronously the pistons 6 and 7 are retracted axially downward. This pushes each workpiece W out of its holder 39 or 40 and into the respective sleeve 12 through 15. Once the workpieces W are thus pushed out of the holder 38, the pushout plungers 23 and 24 are retracted upward.

The holder 38 is then swung out of the press and the arm 25 is swung in, carrying four backing plates B. The piston 20 is then pressurized to push the plug 26 down atop the die sleeves 12 through 15. This leaves the workpieces W confined in respective die cavities each having an upper surface formed by the respective backing plate B carried by the plug 26, a lower surface defined by the respective press plunger 8 through 11, and side walls defined by the respective sleeves 12 through 15.

In this position the chamber 41 of the cylinder block is hydraulically pressurized to push up the pistons 6 and 7 and the plungers 8 through 11, thereby compacting the workpieces W in their die cavities and bonding them to the respective backing plates B.

Once the pressing operation is complete, it being noted that heat is normally simultaneously used to consolidate the workpieces W, the piston 20 is raised and the finished brake shoes are pushed vertically out of the sleeves 12 through 15 by the plungers 8 through 11, leaving them hanging magnetically on the plug 26. The arm 25 is swung out and the magnets 37 are deenergized to drop the finished shoes, and the cycle can then be repeated.

Figure 5:
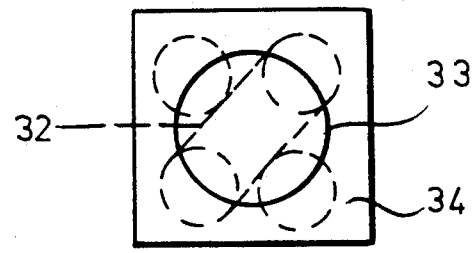

FIG. 5 shows how instead of four plungers, each pair of the pistons 6 and 7 can be coupled by a bridge element 27 and 28 to support only two plungers 29 and 30 that are vertically displaceable in respective complementary passages in a die plate 31 replacing the sleeves 12 through 15. Thus all the force of the four pistons 6 and 7 is brought to bear on just two plungers 29 and 30.

Similarly in FIG. 6 the four pistons are joined by a diagonal bridge 32 to push up a single plunger 33 in a one-hole die plate 34. Thus the force of all four pistons is brought to bear on a single plunger 33. In both the arrangements of FIGS. 5 and 6 the number of pushout plungers 23 and 24 is also changed in accordance with how many press plungers are provided.

I claim:

1. A press for making rigid bodies out of fluent particles, the press comprising:

a frame;

a cylinder block in the frame formed with a plurality of parallel cylinder bores;

respective pistons axially displaceable in the bores of the block;

respective little piston plungers fixed releasably to and projecting outward from the pistons;

respective little dies mounted on the frame and forming cavities in which the little plungers are complementarily engageable, the little plungers being displaceable between advanced positions generally filling the respective dies and retracted positions withdrawn inside the respective dies;

means including a holder for positioning workpieces of the particles in partially compacted condition in line with the cavities of the little dies;

means including respective little pushout plungers displaceable on the frame for pushing the workpieces out of the holders into the respective dies;

a counter piston displaceable hydraulically on the frame against the cavities after the workpieces have been pushed thereinto;

means for pressurizing the cylinders of the block and thereby pushing the little piston plungers into the cavities and compressing the workpieces therein against the counter piston;

a bridge element releasably engageable with at least two of the pistons instead of two of the little piston plungers;

a relatively big piston plunger carried on the bridge element instead of the little piston plungers;

a relatively big die mountable on the frame instead of the little dies and forming a cavity in which the big piston plunger is complementarily engageable; and a relatively big pushout plunger displaceable on the frame instead of the little pushout plungers and operable like the little pushout plungers to push a workpiece out of the holder into the relatively big die.

2. The press defined in claim 1 wherein the block is formed with a single pressurizable chamber into which the cylinders all open.

3. The press defined in claim 1 wherein the bridge element is a plate covering all the pistons and carrying a single said relatively big piston plunger.

4. The press defined in claim 1 wherein there are four pistons arranged in a square array and the bridge extends diagonally of the square array, the relatively big piston plunger being supported on the bridge centrally of the array.

5. The press defined in claim 1 wherein there are relatively big and little holders respectively having relatively big and small passages for holding respective relative big and small workpieces.

* * * * *